US005703963A

United States Patent [19]

Kojima et al.

[11] Patent Number: 5,703,963

[45] Date of Patent: Dec. 30, 1997

[54] CHARACTER RECOGNITION APPARATUS THAT SUBDIVIDES A CHARACTER INTO SUBREGIONS TO OBTAIN FEATURE VECTORS

[75] Inventors: Yoshihiro Kojima, Kobe; Hiroshi Yamamoto, Katano; Susumu Maruno, Osaka; Yasuharu Shimeki, Suita, all of Japan

[73] Assignee: Matsushita Electric Industrial Co., Ltd., Japan

[21] Appl. No.: 332,120

[22] Filed: Oct. 31, 1994

[30] Foreign Application Priority Data

Nov. 4, 1993 [JP] Japan .................................... 5-275726

[51] Int. Cl.[6] ............................. G06K 9/48; G06K 9/56; G06K 9/62; G06K 9/38

[52] U.S. Cl. .......................... 382/197; 382/264; 382/170; 382/199; 382/205

[58] Field of Search .................................... 382/191, 194, 382/197, 264, 199, 170, 205

[56] References Cited

U.S. PATENT DOCUMENTS

| | | | |
|---|---|---|---|
| 4,757,551 | 7/1988 | Kobayashi et al. | 382/197 |
| 4,903,312 | 2/1990 | Sato | 382/197 |
| 4,903,313 | 2/1990 | Tachikawa | 382/197 |
| 4,959,870 | 9/1990 | Tachikawa | 382/170 |

FOREIGN PATENT DOCUMENTS

| | | | |
|---|---|---|---|
| 2190778 | 11/1987 | United Kingdom | G06K 9/36 |

OTHER PUBLICATIONS

*Patent Abstracts of Japan*, vol. 7, No. 234 (P-230), Oct. 18, 1983, Patent No. JP-A-58123175 (Oki Denki Kogyo KK), Yamashita Yoshiyuki, et al., Issued Jul. 22, 1983, Abstract.

*Primary Examiner*—Leo Boudreau
*Assistant Examiner*—Monica S. Davis
*Attorney, Agent, or Firm*—Beveridge, DeGrandi, Weilacher & Young, L.L.P.

[57] ABSTRACT

A character recognition apparatus is provided which, even when there occurs a local positional deviation of a character to be recognized, can stably recognize the character with high accuracy. For each contour point of a character image, a contouring direction code imparting unit 15 obtains a contouring direction code in which a contouring line direction of the character is quantized in four directions. A contouring direction code frequency calculation unit 16 calculates the frequency of each contouring direction code for each subregion of the character image. A contouring direction code density calculation unit 17 calculates the density of the contouring direction codes of each subregion, by using the frequency of the direction codes and the size of the respective subregion. A contouring direction code space blurring unit 18 conducts a weighted addition on each of the obtained contouring direction codes by adding, with a predetermined weight coefficient, the contouring direction code densities of neighbor subregions which are adjacent to the respective subregion with the subregion as the center and in a direction perpendicular to that of each of the contouring direction codes.

9 Claims, 13 Drawing Sheets

FIG. 3(e)
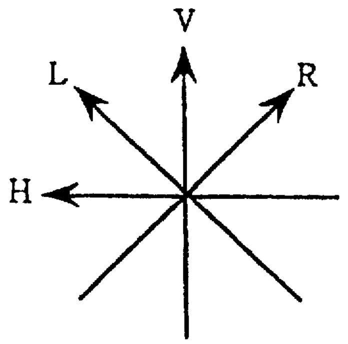
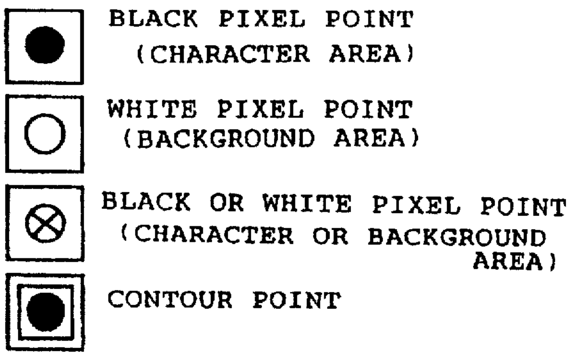
FIG. 3(a)
FIG. 3(b)
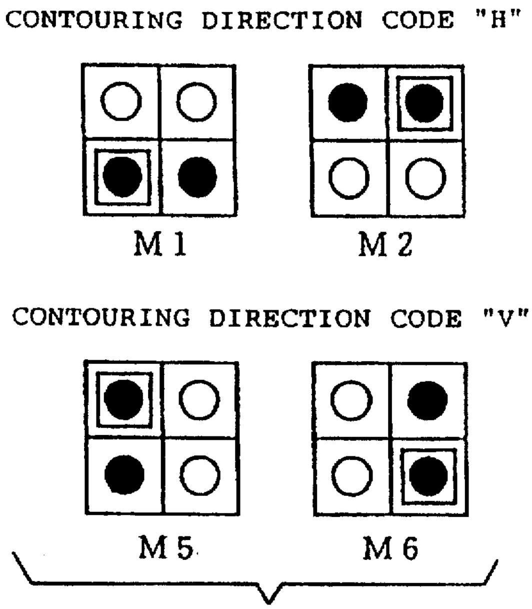
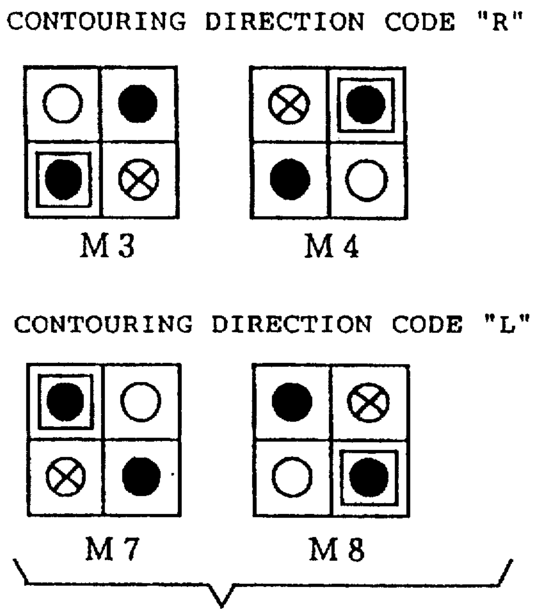
FIG. 3(c)
FIG. 3(d)
CONTOURING DIRECTION CODE "H"
M1　　　M2
CONTOURING DIRECTION CODE "R"
M3　　　M4
CONTOURING DIRECTION CODE "V"
M5　　　M6
CONTOURING DIRECTION CODE "L"
M7　　　M8

CONTOURING DIRECTION CODE "H"

| 6 | 4 | 19 | 10 |
|---|---|----|----|
| 5 | 3 | 0  | 0  |
| 0 | 1 | 1  | 0  |
| 3 | 0 | 1  | 22 |

FIG.5(a)

CONTOURING DIRECTION CODE "R"

| 2  | 2 | 5 | 3 |
|----|---|---|---|
| 3  | 3 | 0 | 0 |
| 2  | 5 | 0 | 0 |
| 23 | 2 | 0 | 1 |

FIG.5(b)

CONTOURING DIRECTION CODE "V"

| 0  | 8  | 0 | 2 |
|----|----|---|---|
| 1  | 20 | 0 | 0 |
| 8  | 11 | 2 | 0 |
| 11 | 2  | 0 | 0 |

FIG.5(c)

CONTOURING DIRECTION CODE "L"

| 0 | 5 | 0  | 1  |
|---|---|----|----|
| 2 | 3 | 2  | 0  |
| 0 | 2 | 18 | 4  |
| 0 | 0 | 2  | 17 |

FIG.5(d)

CONTOURING DIRECTION CODE "H"

| 0.40 | 0.44 | 1.58  | 0.43 |
|------|------|-------|------|
| 0.33 | 0.33 | 0.0   | 0.0  |
| 0.0  | 0.11 | 0.083 | 0.0  |
| 0.20 | 0.0  | 0.083 | 0.96 |

FIG.6(a)

CONTOURING DIRECTION CODE "R"

| 0.17 | 0.22 | 0.42 | 0.25 |
|------|------|------|------|
| 0.20 | 0.33 | 0.0  | 0.0  |
| 0.14 | 0.56 | 0.0  | 0.0  |
| 1.53 | 0.22 | 0.0  | 0.05 |

FIG.6(b)

CONTOURING DIRECTION CODE "V"

| 0.0   | 0.67 | 0.0  | 0.17 |
|-------|------|------|------|
| 0.067 | 1.33 | 0.0  | 0.0  |
| 0.57  | 0.79 | 0.14 | 0.0  |
| 0.55  | 0.10 | 0.0  | 0.0  |

FIG.6(c)

CONTOURING DIRECTION CODE "L"

| 0.0  | 0.56 | 0.0  | 0.083 |
|------|------|------|-------|
| 0.13 | 0.33 | 0.17 | 0.0   |
| 0.0  | 0.22 | 1.5  | 0.29  |
| 0.0  | 0.0  | 0.17 | 0.85  |

| | | |
|---|---|---|
| $B_k(0,0)$ | $B_k(1,0)$ | $B_k(2,0)$ |
| $B_k(0,1)$ | $B_k(1,1)$ | $B_k(2,1)$ |
| $B_k(0,2)$ | $B_k(1,2)$ | $B_k(2,2)$ |

FIG. 7(e)

CONTOURING DIRECTION CODE "H" (HORIZONTAL)

| | | |
|---|---|---|
| 0 | p | 0 |
| 0 | 1 | 0 |
| 0 | p | 0 |

FIG. 7(a)

CONTOURING DIRECTION CODE "V" (VERTICAL)

| | | |
|---|---|---|
| 0 | 0 | 0 |
| p | 1 | p |
| 0 | 0 | 0 |

FIG. 7(b)

WHERE $0 \leq p \leq 1$

CONTOURING DIRECTION CODE "L" (LOWER RIGHT)

| | | |
|---|---|---|
| 0 | q | r |
| q | 1 | q |
| r | q | 0 |

FIG. 7(c)

CONTOURING DIRECTION CODE "R" (UPPER RIGHT)

| | | |
|---|---|---|
| r | q | 0 |
| q | 1 | q |
| 0 | q | r |

FIG. 7(d)

WHERE $0 \leq r \leq q \leq 1$

FIG. 8(a)

CONTOURING DIRECTION CODE "H"

| | | | |
|---|---|---|---|
| 0.48 | 0.53 | 1.58 | 0.43 |
| 0.43 | 0.47 | 0.42 | 0.11 |
| 0.13 | 0.19 | 0.10 | 0.24 |
| 0.20 | 0.028 | 0.10 | 0.96 |

FIG. 8(b)

CONTOURING DIRECTION CODE "R"

| | | | |
|---|---|---|---|
| 0.22 | 0.32 | 0.47 | 0.29 |
| 0.29 | 0.44 | 0.088 | 0.042 |
| 0.40 | 0.64 | 0.073 | 0.0054 |
| 1.57 | 0.45 | 0.049 | 0.050 |

FIG. 8(c)

CONTOURING DIRECTION CODE "V"

| | | | |
|---|---|---|---|
| 0.17 | 0.67 | 0.21 | 0.17 |
| 0.40 | 1.35 | 0.33 | 0.0 |
| 0.77 | 0.96 | 0.34 | 0.036 |
| 0.57 | 0.24 | 0.025 | 0.0 |

FIG. 8(d)

CONTOURING DIRECTION CODE "L"

| | | | |
|---|---|---|---|
| 0.074 | 0.60 | 0.098 | 0.089 |
| 0.19 | 0.45 | 0.37 | 0.11 |
| 0.05 | 0.42 | 1.59 | 0.54 |
| 0.0079 | 0.095 | 0.43 | 0.90 |

FIG.10(i)
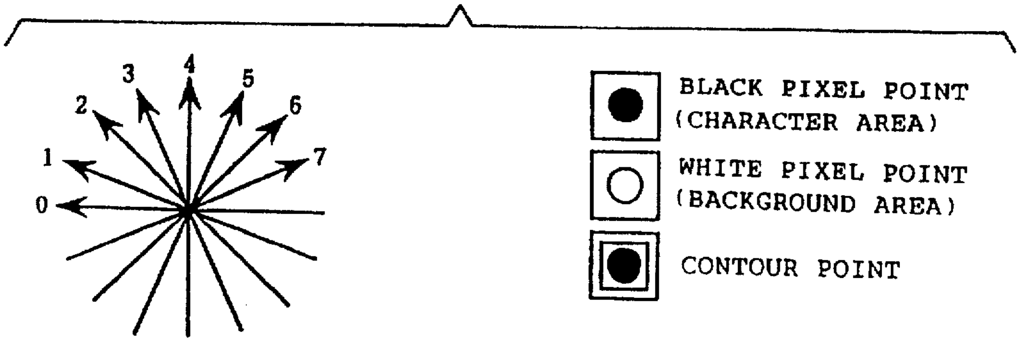
CONTOURING DIRECTION CODE "0"
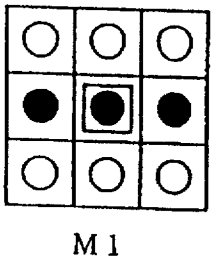
FIG.10(a)
CONTOURING DIRECTION CODE "2"
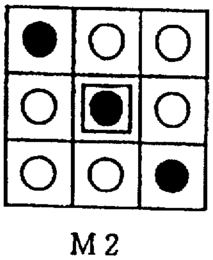
FIG.10(b)
CONTOURING DIRECTION CODE "4"
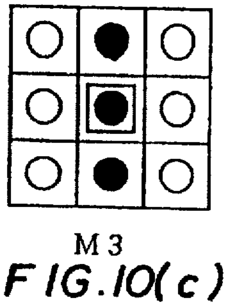
FIG.10(c)
CONTOURING DIRECTION CODE "6"
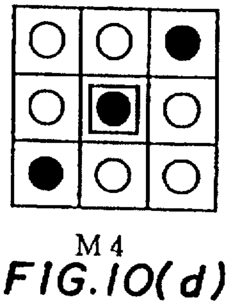
FIG.10(d)
CONTOURING DIRECTION CODE "1"
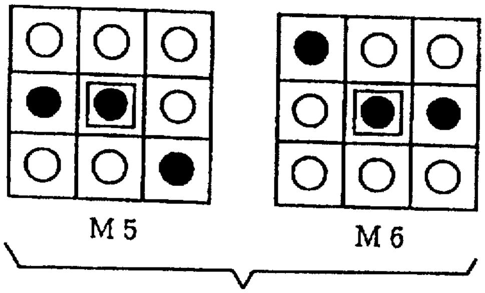
FIG.10(e)
CONTOURING DIRECTION CODE "3"
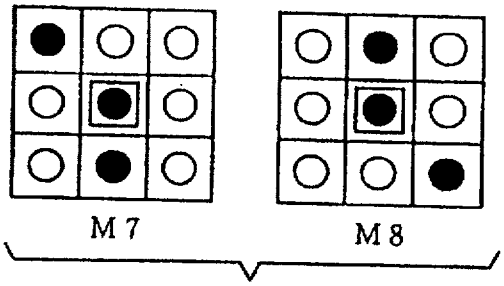
FIG.10(f)
CONTOURING DIRECTION CODE "5"
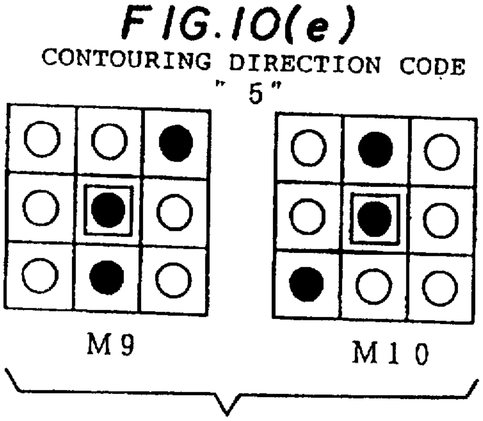
FIG.10(g)
CONTOURING DIRECTION CODE "7"
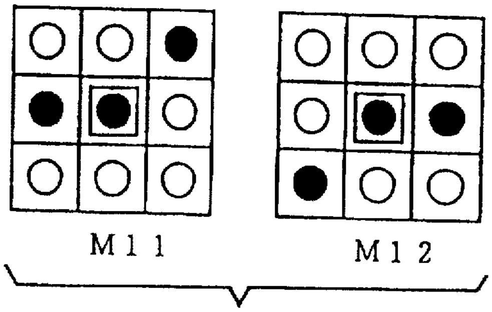
FIG.10(h)

FIG. 12(a)

CONTOURING DIRECTION CODE "0"

| | | | |
|---|---|---|---|
| 4 | 2 | 15 | 6 |
| 4 | 1 | 0 | 0 |
| 0 | 0 | 0 | 0 |
| 2 | 0 | 0 | 10 |

FIG. 12(b)

CONTOURING DIRECTION CODE "1"

| | | | |
|---|---|---|---|
| 0 | 2 | 0 | 1 |
| 2 | 1 | 0 | 0 |
| 0 | 1 | 2 | 0 |
| 0 | 0 | 2 | 21 |

FIG. 12(c)

CONTOURING DIRECTION CODE "2"

| | | | |
|---|---|---|---|
| 0 | 1 | 0 | 0 |
| 0 | 2 | 2 | 0 |
| 0 | 2 | 15 | 4 |
| 0 | 0 | 1 | 5 |

FIG. 12(d)

CONTOURING DIRECTION CODE "3"

| | | | |
|---|---|---|---|
| 0 | 6 | 0 | 1 |
| 1 | 2 | 0 | 0 |
| 0 | 0 | 4 | 0 |
| 0 | 0 | 0 | 0 |

CONTOURING DIRECTION CODE "4"

| | | | |
|---|---|---|---|
| 0 | 4 | 0 | 1 |
| 0 | 17 | 0 | 0 |
| 5 | 6 | 0 | 0 |
| 1 | 0 | 0 | 0 |

FIG. 12(e)

CONTOURING DIRECTION CODE "5"

| | | | |
|---|---|---|---|
| 0 | 1 | 0 | 1 |
| 1 | 5 | 0 | 0 |
| 6 | 9 | 0 | 0 |
| 22 | 2 | 0 | 0 |

FIG. 12(f)

CONTOURING DIRECTION CODE "6"

| | | | |
|---|---|---|---|
| 0 | 1 | 0 | 0 |
| 0 | 0 | 0 | 0 |
| 0 | 0 | 0 | 0 |
| 11 | 0 | 0 | 0 |

FIG. 12(g)

CONTOURING DIRECTION CODE "7"

| | | | |
|---|---|---|---|
| 5 | 3 | 9 | 5 |
| 3 | 0 | 0 | 0 |
| 0 | 1 | 0 | 0 |
| 1 | 0 | 0 | 2 |

FIG. 12(h)

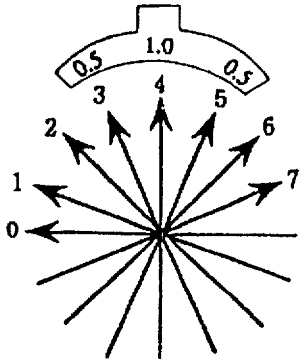
DIRECTIONS OF CONTOURING DIRECTION CODE (8 DIRECTIONS)
FIG. 13(a)
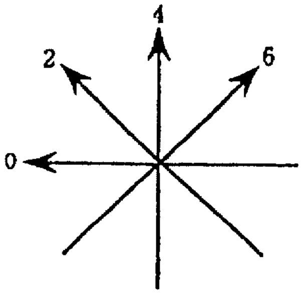
DIRECTIONS OF CONTOURING DIRECTION CODE (4 DIRECTIONS)
FIG. 13(b)
FIG. 14(a)
CONTOURING DIRECTION CODE "0"
| | | | |
|---|---|---|---|
| 6.5 | 4.5 | 19.5 | 9.0 |
| 6.5 | 1.5 | 0.0 | 0.0 |
| 0.0 | 1.0 | 1.0 | 0.0 |
| 2.5 | 0.0 | 1.0 | 21.5 |
FIG. 14(b)
CONTOURING DIRECTION CODE "2"
| | | | |
|---|---|---|---|
| 0.0 | 5.0 | 0.0 | 1.0 |
| 1.5 | 3.5 | 2.0 | 0.0 |
| 0.0 | 2.5 | 18.0 | 4.0 |
| 0.0 | 0.0 | 2.0 | 15.5 |
CONTOURING DIRECTION CODE "4"
| | | | |
|---|---|---|---|
| 0.0 | 7.5 | 0.0 | 2.0 |
| 1.0 | 20.5 | 0.0 | 0.0 |
| 8.0 | 10.5 | 2.0 | 0.0 |
| 12.0 | 1.0 | 0.0 | 0.0 |
FIG. 14(c)
CONTOURING DIRECTION CODE "6"
| | | | |
|---|---|---|---|
| 2.5 | 3.0 | 4.5 | 3.0 |
| 2.0 | 2.5 | 0.0 | 0.0 |
| 3.0 | 5.0 | 0.0 | 0.0 |
| 22.5 | 1.0 | 0.0 | 1.0 |
FIG. 14(d)

CHARACTER RECOGNITION APPARATUS THAT SUBDIVIDES A CHARACTER INTO SUBREGIONS TO OBTAIN FEATURE VECTORS

BACKGROUND OF THE INVENTION

1. Field of the Invention

The invention relates to a character recognition apparatus which recognizes printed characters of a newspaper, a magazine or the like, and hand-written characters.

2. Related Art of the Invention

A character recognition apparatus of the prior art is disclosed in, for example, Japanese patent publication (Kokai) No. SHO61-125688.

FIG. 16 is a diagram showing the configuration of the prior art character recognition apparatus. In FIG. 16, 101 designates an image input unit through which an image including a recognition object character is inputted, and 102 designates a character segmentation unit which separates a rectangular segment of a character image of the recognition object from the image input to the image input unit 101. The reference numeral 103 designates a contouring direction feature extraction unit which obtains a contouring direction feature vector for detecting a character from the rectangular character image segment obtained by the character segmentation unit 102. A contouring direction feature vector indicates a feature of a character by means of the directionality of a contour line of the character. The reference numeral 104 designates a recognition dictionary which stores contouring direction feature vectors for all character categories of recognition objects, and 105 designates a character recognition unit which checks the contouring direction feature vector obtained by the contouring direction feature extraction unit 103 with the contouring direction feature vectors stored in the recognition dictionary 104, to extract recognition candidate characters.

The contouring direction feature extraction unit 103 consists of a contouring direction code imparting unit 106, and a contouring direction code frequency calculation unit 106. The contouring direction code imparting unit 106 determines contouring direction codes (including four kinds of codes indicative of horizontal, vertical, upper right, and lower right directions) of contour points of the character image of the recognition object separated by the character segmentation unit 102. The contouring direction code frequency calculation unit 107 calculates the frequencies of the contouring direction codes obtained by the contouring direction code imparting unit 106, in each of the subregions obtained by dividing the rectangle which is separated by the character segmentation unit 102 into M and N sections in horizontal and vertical directions (where M and N are arbitrary natural numbers).

The operation of the thus configured prior art character recognition apparatus will be described.

First the image input unit 101 receives an image including a recognition object character and binarizes the image. As shown in FIG. 2, the character segmentation unit 102 then separates a rectangular pattern circumscribing the character from the binarized input image, as a character image. From the character image separated by the character segmentation unit 102, the contouring direction feature extraction unit 103 then obtains a contouring direction feature vector which is required for character recognition in the character recognition unit 105.

The contouring direction feature extraction unit 103 operates in the following manner: First the contouring direction code imparting unit 106 compares the polarity of each pixel point of the character image separated by the character segmentation unit 102 (i.e., whether the pixel point is a black pixel or a white pixel) with the polarities of 8 pixel points adjacent to the pixel point. When at least one of these pixel points has a different polarity, this pixel point is regarded as a contour point, and determines the contouring direction code of each of the contour points of the character image in accordance with the relationship between the contour point and the eight adjacent pixel points such as shown in FIGS. 3(*a*)–3(*e*). For each of 16 subregions obtained by dividing the character image into 4 sections (M=4) in a horizontal direction and 4 sections (N=4) in a vertical direction, as shown in FIG. 4, the contouring direction code frequency calculation unit 107 then calculates the contouring direction codes of the contour points obtained by the contouring direction code imparting unit 106, and obtains the frequencies of the contouring direction codes of the four kinds. The frequencies are used as a contouring direction feature vector. In other words, the contouring direction feature vector has 4(M)×4(N)×4, or 64 dimensions.

Next the character recognition unit 105 checks the contouring direction feature vector obtained by the contouring direction feature extraction unit 103 with typical contouring direction feature vectors of character categories which have been obtained by feature extraction in the same manner as described above and stored in the recognition dictionary 104, and extracts recognition candidate characters.

Recently, the directional feature of a character line has been recognized to be effective as a feature of a character in a character recognition process, as described by, for example, Saito, Yamada, and Yamamoto, Analysis of handwritten characters in accordance with direction pattern matching, Journal of Institute of Electronics and Communication Engineers of Japan (D), Vol. J65-D, No. 5, pp. 550–557, May, 1982.

Also the above-mentioned character recognition apparatus of the prior art is configured on the basis of the effectiveness of a directional feature, and uses a local directional feature of a character contour line as a feature amount of the character.

When a hand-written character, the shape of which varies depending on a writer and a writing instrument, is to be recognized, for example, a character line locally varies in a greater degree in position or thickness. Therefore, there frequently occurs the case where the character line is positionally deviated into a neighbor subregion. This produces a problem in that a prior art character recognition apparatus in which a directional feature of a local contour line of a character is used as a feature amount cannot exhibit a sufficient recognition performance. When a kanji (Chinese character) is to be recognized, such a character has a complex shape and there are many characters similar to the character (for example, "輪", "輸", "論", and "諭"). In order to discriminate these characters from each other, therefore, a character image must be divided into subregions in a certain fine degree. As the number of subregions is larger, the above-mentioned positional deviation of a character line into a neighbor subregion occurs more frequently, thereby producing a problem in that a sufficient recognition performance cannot always be attained.

SUMMARY OF THE INVENTION

In view of these problems of a character recognition apparatus of the prior art, the invention has an object of providing a character recognition apparatus which, even when there occurs a local positional deviation of a character to be recognized, can stably recognize the character with high accuracy.

The character recognition apparatus of the invention comprises: contouring direction code imparting means for obtaining, for each of contour points of an input character image, contouring direction codes in which a direction of a contour line of a character is quantized in at least four directions, from at least a pattern of pixels adjacent to the contour point; contouring direction code frequency calculation means for obtaining a frequency of each of the obtained contouring direction codes, for each of the subregions obtained by dividing the character image into M sections in a horizontal direction and N sections in a vertical direction; contouring direction code space blurring means for, on the basis of the obtained frequency or information relating to the frequency, such as a density in the subregion, conducting, for each of the contouring direction codes, a weighted addition on the frequency or the information relating to the frequency of each subregion (A) by adding, with a predetermined weight coefficient, the frequency or the information relating to the frequency of a subregion in the vicinity of the subregion (A); and character recognition means for, on the basis of the obtained result, extracting recognition candidate characters.

According to the invention, for each of contour points of an input character image, the contouring direction code imparting means obtains contouring direction codes in which a direction of a contour line of a character is quantized in at least four directions, from at least a pattern of pixels adjacent to the contour point. The contouring direction code frequency calculation means obtains a frequency of each of the obtained contouring direction codes, for each of subregions obtained by dividing the character image into M sections in a horizontal direction and N sections in a vertical direction. On the basis of the obtained frequency or information relating to the frequency, such as a density in the subregion, the contouring direction code space blurring means conducts, for each of the contouring direction codes, a weighted addition on the frequency or the information relating to the frequency of each subregion (A) by adding, with a predetermined weight coefficient, the frequency or the information relating to the frequency of a subregion in the vicinity of the subregion (A). The character recognition means extracts recognition candidate characters on the basis of the obtained result.

BRIEF DESCRIPTION OF THE DRAWINGS

FIGS. 3(*a*)–3(*e*) collectively show mask patterns for determining a contouring direction code of a contour point in the character recognition apparatus of the first embodiment.

FIGS. 5(*a*)–5(*d*) are diagrams showing contouring direction code frequency matrices of the recognition object character "大" in the first embodiment.

FIGS. 6(*a*)–6(*d*) are diagrams showing contouring direction code density matrices of the recognition object character "大" in the first embodiment.

FIGS. 7(*a*)–7(*e*) are diagrams showing direction blurring process masks used in a contouring direction code space blurring unit of the first embodiment.

FIGS. 8(*a*)–(*d*) are diagrams showing contouring direction code density matrices of the recognition object character "大" obtained from the contouring direction code space blurring unit of the first embodiment.

FIGS. 10(*a*)–10(*i*) are diagrams showing 3×3 mask patterns for determining a contouring direction code of a contour point in the second embodiment.

FIGS. 12(*a*)–12(*h*) are diagrams showing contouring direction code frequency matrices of the recognition object character "大" in the second embodiment.

FIGS. 13(*a*) and 13(*b*) are diagrams showing direction blurring filters used in a contouring direction code space blurring unit of the second embodiment.

FIGS. 14(*a*)–14(*d*) are diagrams showing contouring direction code frequency matrices of the recognition object character "大" obtained from the contouring direction code direction blurring unit of the second embodiment.

[Legend of Reference Numerals]

10 image input unit

11 character segmentation unit

12 contouring direction feature extraction unit

14 character recognition unit

Figure 1:
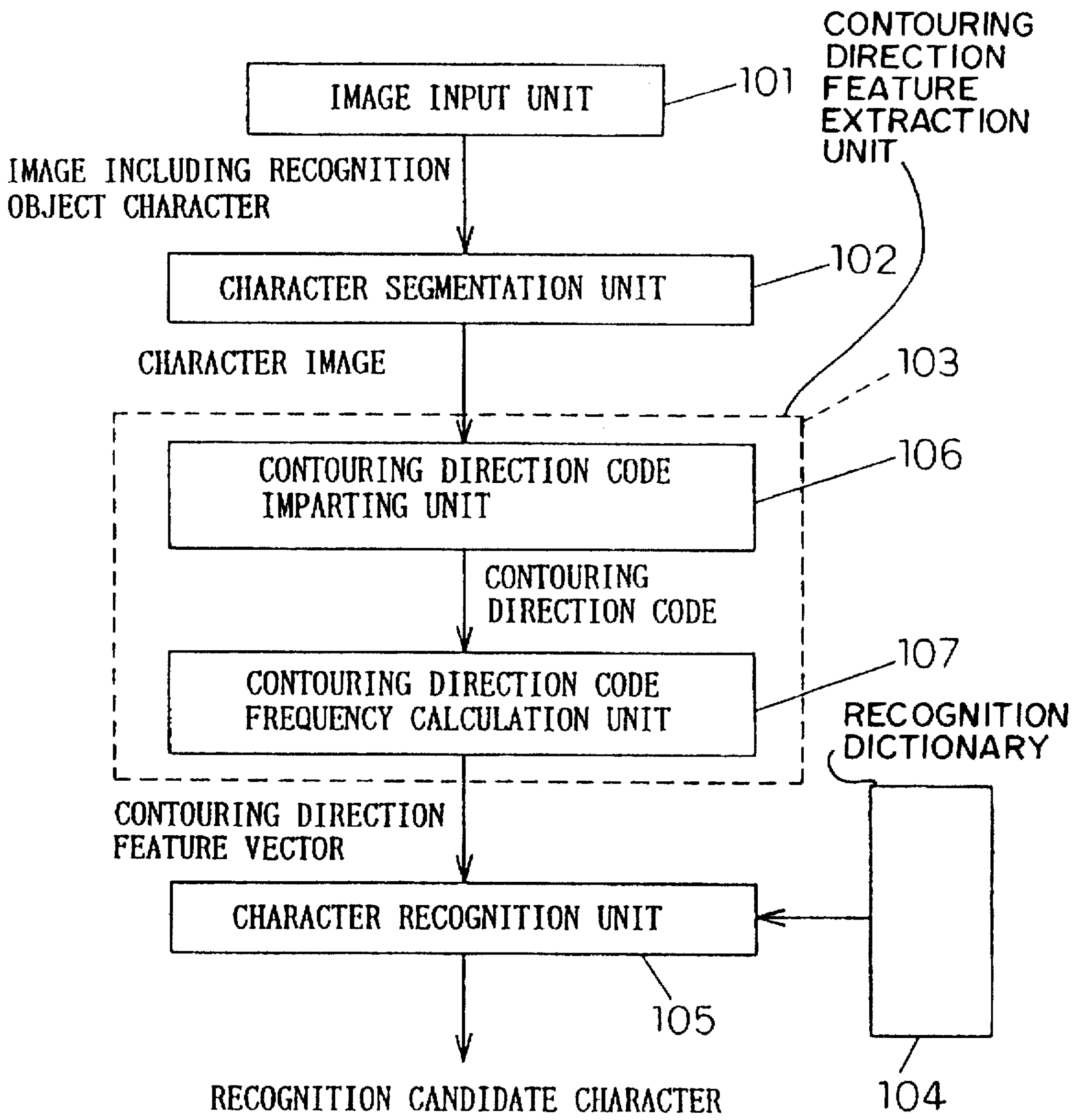
FIG. 1 is a block diagram of a character recognition apparatus of a first embodiment of the invention.

15, 21 contouring direction code imparting unit

16, 22 contouring direction code frequency calculation unit

17, 24 contouring direction code density calculation unit

18, 25 contouring direction code space blurring unit

23 contouring direction code direction blurring unit

26 contouring direction code density weighted average unit

PREFERRED EMBODIMENTS

Hereinafter, the invention will be described with reference to the drawings showing its embodiments.

FIG. 1 is a block diagram of a character recognition apparatus of a first embodiment of the invention. In FIG. 1, 10 designates an image input unit such as an image scanner through which an image including a recognition object character is inputted, and 11 designates a character segmentation unit which separates a rectangular segment of a character image of the recognition object from the image input to the image input unit 10. The reference numeral 12 designates a contouring direction feature extraction unit which obtains a contouring direction feature vector for detecting a character from the rectangular character image segment obtained by the character segmentation unit 11. A contouring direction feature vector indicates a feature of a character by means of the directionality of a contour line of the character. The reference numeral 13 designates a recognition dictionary which stores contouring direction feature vectors for all character categories of recognition objects. The reference numeral 14 designates a character recognition unit which checks the contouring direction feature vector obtained by the contouring direction feature extraction unit 12 with the contouring direction feature vectors stored in the recognition dictionary 13, to extract recognition candidate characters.

In the contouring direction feature extraction unit 12, 15 designates a contouring direction code imparting unit which determines contouring direction codes for four directions (respectively indicative of horizontal, vertical, upper right, and lower right directions) of contour points of the character image of the recognition object separated by the character segmentation unit 11. The reference numeral 16 designates a contouring direction code frequency calculation unit which calculates the frequencies of the contouring directions obtained by the contouring direction code imparting unit 15, in each of subregions obtained by dividing the rectangle which is separated by the character segmentation unit 11, into M and N sections in horizontal and vertical directions (where M and N are arbitrary natural numbers). The reference numeral 17 designates a contouring direction code density calculation unit which calculates the density of the contouring direction codes of each of the subregions, by using the frequencies of the direction codes obtained by the contouring direction code frequency calculation unit 16, and the size of the respective subregion. The reference numeral 18 designates a contouring direction code space blurring unit which conducts a weighted addition on each of the contouring direction codes of the subregions by adding, with an arbitrary weight coefficient, the contouring direction code densities of neighbor subregions which are adjacent to the respective subregion with the subregion as the center and in a direction perpendicular to that of each of the contouring direction codes, thereby obtaining a contouring direction feature vector of (M×N×4) dimensions.

The operation of the thus configured character recognition apparatus in the case where the recognition object character is "大" will be described.

Figure 2:
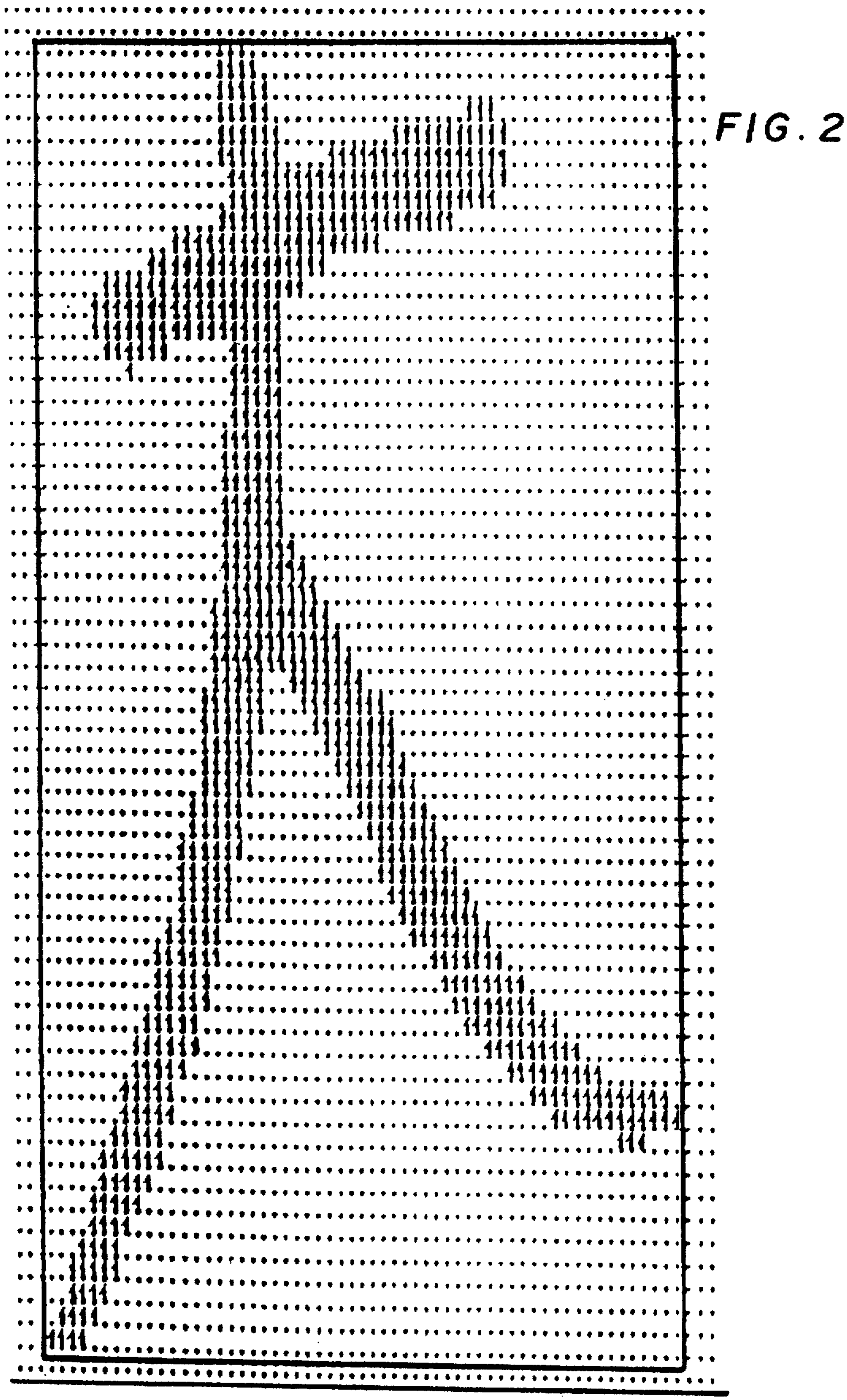
FIG. 2 is a diagram showing a character image in which a recognition object character "大" is binarized.

First the image input unit 10 receives an image including the recognition object character "大" and digitizes it. As shown in FIG. 2, the character segmentation unit 11 then separates a rectangular pattern circumscribing the character from the binarized input image, as a character image. Thereafter, the contouring direction feature extraction unit 12 obtains a contouring direction feature vector which is required for character recognition in the character recognition unit 14.

Figure 4:
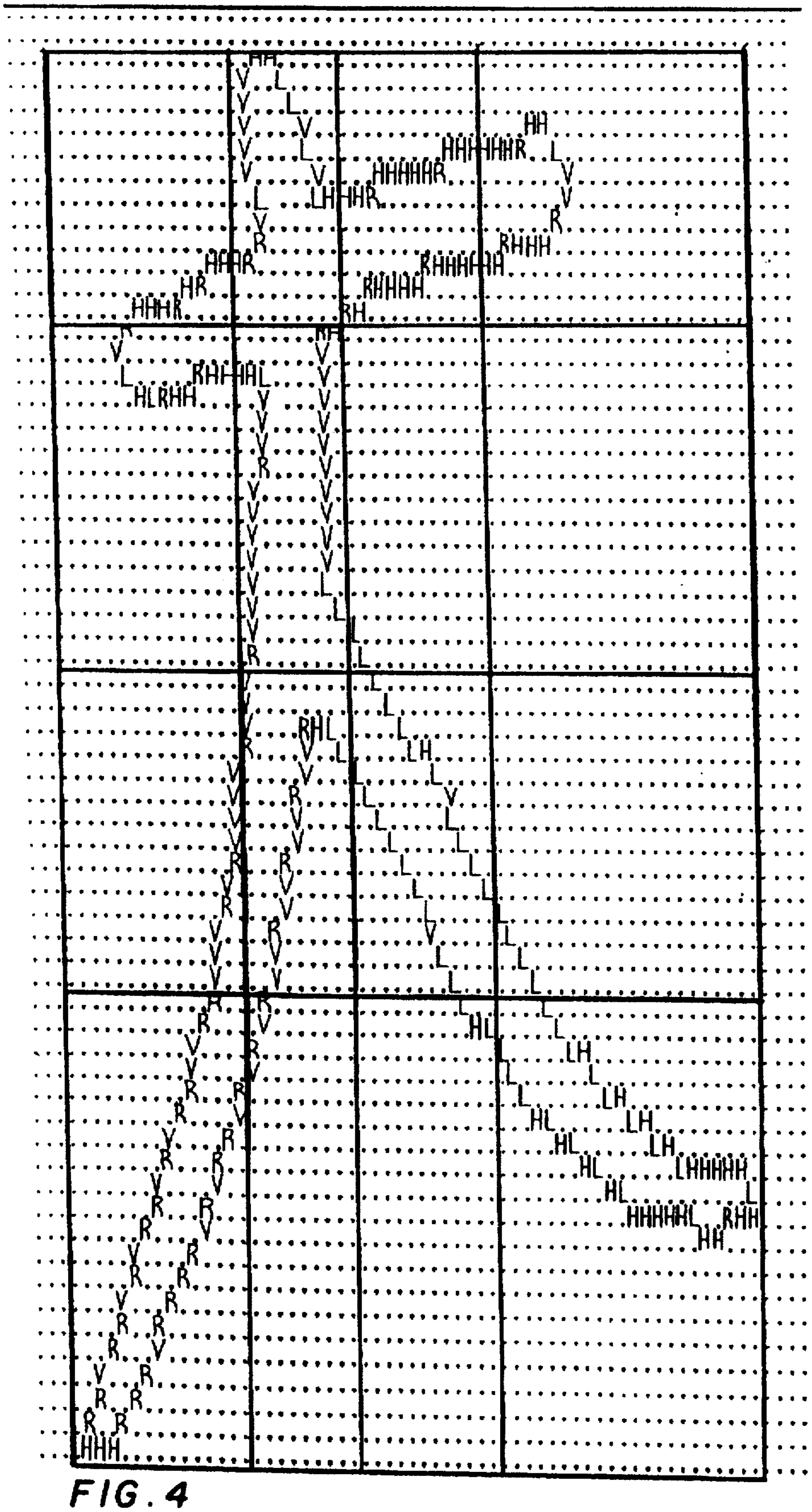
FIG. 4 is a diagram showing an example in which contour points of the recognition object character "大" are respectively provided with contouring direction codes in the first embodiment.

The contouring direction feature extraction unit 12 operates in the following manner: First the contouring direction code imparting unit 15 extracts contour points existing on a contour line of the character image separated by the character segmentation unit 11, and determines contouring direction codes of the extracted contour points. In this determination, the judgment on a contour point is conducted by using a mask of, for example, 3×3. More specifically, the polarity of each pixel point (i.e., whether the pixel point is a black pixel or a white pixel) is compared with the polarities of 8 pixel points adjacent to the pixel point. When at least one of these pixel points has a different polarity, this pixel point is judged to be a contour point. The contouring direction code of each contour point is determined by scanning the character image by using a mask of 2×2, and checking whether the character image coincides with one of mask patterns such as shown in FIGS. 3(*a*)–3(*e*), thereby providing each contour point with a contouring direction code in which a contour line direction of the character is quantized in the four directions. When a mask of 2×2 wherein a certain contour point is used as a point of attention coincides with a mask pattern M1 or M2 shown in FIGS. 3(*a*)–3(*e*), for example, the contour point in attention is provided with a horizontal contouring direction code "H". Similarly, the contour point is provided with a vertical contouring direction code "V" when the mask coincides with a mask pattern M5 or M6, with an upper left contouring direction code "L" when the mask coincides with a mask pattern M7 or M8, and with an upper right contouring direction code "R" when the mask coincides with a mask pattern M3 or M4. FIG. 4 shows an example in which the contour points of the recognition object character "大" of FIG. 2 are provided with such contouring direction codes in the manner described above.

For each of 16 subregions obtained by dividing the character image into 4 sections (M=4) in a horizontal direction and 4 sections (N=4) in a vertical direction, as shown in FIG. 4, the contouring direction code frequency calculation unit 16 then counts the contouring direction codes of the contour points obtained by the contouring direction code imparting unit 15, and obtains the frequencies of the contouring direction codes of the four kinds. FIGS. 5(*a*)–5(*d*) show the frequencies of the contouring direction codes of the subregions of the recognition object character "大", in the form of 4×4 matrices of contouring direction code frequency with respect to the four directions of "H", "V", "L", and "R". In the embodiment, the character image is divided into the subregions by barycentric division on the basis of the marginal distribution of the character (the distribution of the number of black pixel points in the case where the character image is projected to horizontal and vertical sides of a frame circumscribing the image). Alternatively, the division may be conducted by another method. For example, a simple division method in which the width and height of a character are equally divided may be employed. In the embodiment, the contouring direction codes of the four directions are obtained. Alternatively, contouring direction codes of eight directions may be obtained.

After the calculation of the contouring direction code frequency, for each of the subregions, the contouring direction code density calculation unit 17 calculates the density of the contouring direction codes (hereinafter, referred to as "contouring direction code density") of each subregion by normalizing (dividing) the frequencies of the contouring direction codes obtained by the contouring direction code frequency calculation unit 16, by the size of the respective subregions (e.g., the area, horizontal width, or vertical width of the subregion). FIGS. 6(*a*)–6(*d*) show the contouring direction code densities of the subregions of the recognition object character "大", in the form of matrices in the same manner as FIGS. 5(*a*)–5(*d*). In FIGS. 6(*a*)–6(*d*), however, the contouring direction codes "H" were normalized by the horizontal width of the respective subregions, the contouring direction codes "V" by the vertical width of the respective subregions, and the contouring direction codes "L" and "R" by the horizontal width or vertical width of the respective subregions whichever is smaller than the other.

The contouring direction code space blurring unit 18 then conducts a weighted addition on the contouring direction code density of each subregion by adding, with a predetermined weight coefficient, the contouring direction code densities of neighbor subregions which are adjacent to the subregion with the subregion as the center and in a direction perpendicular to that of each of the contouring direction codes. As a result, the contouring direction code densities are spatially blurred. Specifically, contouring direction code density matrices $F_k(i, j)$ (where i and j indicate the subregions, k indicates the direction of a direction code, and, in the embodiment, $0 \leqq i, j$, and $k \leqq 3$) for the directions of each contouring direction code shown in FIGS. 6(*a*)–6(*d*) are subjected to a blurring process by using direction blurring process masks $B_k(i, j)$ ($0 \leqq i, j$, and $k \leqq 3$) such as shown in FIGS. 7(*a*)–7(*d*). That is, as shown in Equation 1, the contouring direction code density matrices $F_k(i, j)$ are converted into $G_k(i, j)$ by using the blurring process masks $B_k(i, j)$.

$$G_k(i,j) = \sum_{r=o}^{2} \sum_{s=o}^{2} B_k(r,s) F_k(i-r, j-s) \quad \text{[Eq. 1]}$$

When setting p=0.25, q=0.1071, and r=0.03571 and using the direction blurring process masks shown in FIGS. 7(*a*)–7(*d*), for example, the contouring direction code density matrices $G_k(i, j)$ of the recognition object character "大" which has been subjected to the blurring process are as shown in FIGS. 8(*a*)–8(*d*). A collection of the obtained contouring direction code density matrices $G_k(i, j)$ constitutes a contouring direction feature vector. In the embodiment, the contouring direction feature vector has 4(M)×4(N)×4 or 64 dimensions.

Finally the character recognition unit 14 checks the contouring direction feature vector for the recognition object character "大" and obtained in the contouring direction feature extraction unit 12, with contouring direction feature vectors of character categories which have been obtained by feature extraction in the same manner as described above and stored in the recognition dictionary 13, to obtain similarities between the recognition object character and the character categories. A plurality of characters having a larger similarity are extracted as recognition candidate characters.

Results of the character recognition according to the embodiment which were experimentally obtained will be described. In the recognition experiments, the database of JIS first level hand-written kanjis of DENSOKEN (ETL9B: 71 kinds of hiraganas, and 2,965 kinds of JIS first level hand-written kanjis (total: 3,036 kinds of characters) was used. The initial 10 sets (30,360 characters) were used as learning data of the recognition dictionary 13, and the subsequent 10 sets as evaluation data. The recognition dictionary 13 is prepared by averaging contouring direction feature vectors obtained on the learning data, for each character category. In the embodiment described above, the parameters M and N of the region division number for a character image are set to be 4 (i.e., M=4, and N=4). In the experiments, M=8, and N=8 were set so that a character image was divided into 64 subregions. Namely, a feature vector has 256 dimensions. For comparison, recognition experiments were conducted on a prior art character recognition apparatus under the same conditions.

As a result of the experiments, the embodiment attained a recognition rate of 93.0%, and the prior art character recognition apparatus a recognition rate of 91.1%, showing that the embodiment can improve the recognition performance.

According to the embodiment, as described above, for each direction of each direction code, the contouring direction code space blurring unit 18 conducts the blurring process in a direction perpendicular to the direction of the direction code, on the character feature amount obtained as the density of directional components of a contour line of a character of each local region. As compared with a feature amount which is used in the prior art example and has not been subjected to a blurring process, a feature amount which has been subjected to such a blurring process has a very small variation amount or is stable even when a character line is positionally deviated into a neighbor subregion by a local variation in position or thickness of the character line. It is often that such a positional deviation of a character line independently occurs for each character line. Particularly, a fatal positional deviation of a character line frequently occurs in a direction perpendicular to that of the character line. Consequently, the blurring process perpendicular to a directional component is very effective. Namely, the blurring process causes the variation of a feature amount to be insensitive to a positional deviation of a certain degree of a character line, with the result that a stable feature amount is obtained. Even when the recognition object is a character such as a hand-written kanji which has a complex structure and in which positions of character lines locally vary in a very large degree, therefore, the embodiment can attain a highly accurate and stable recognition performance.

Figure 9:
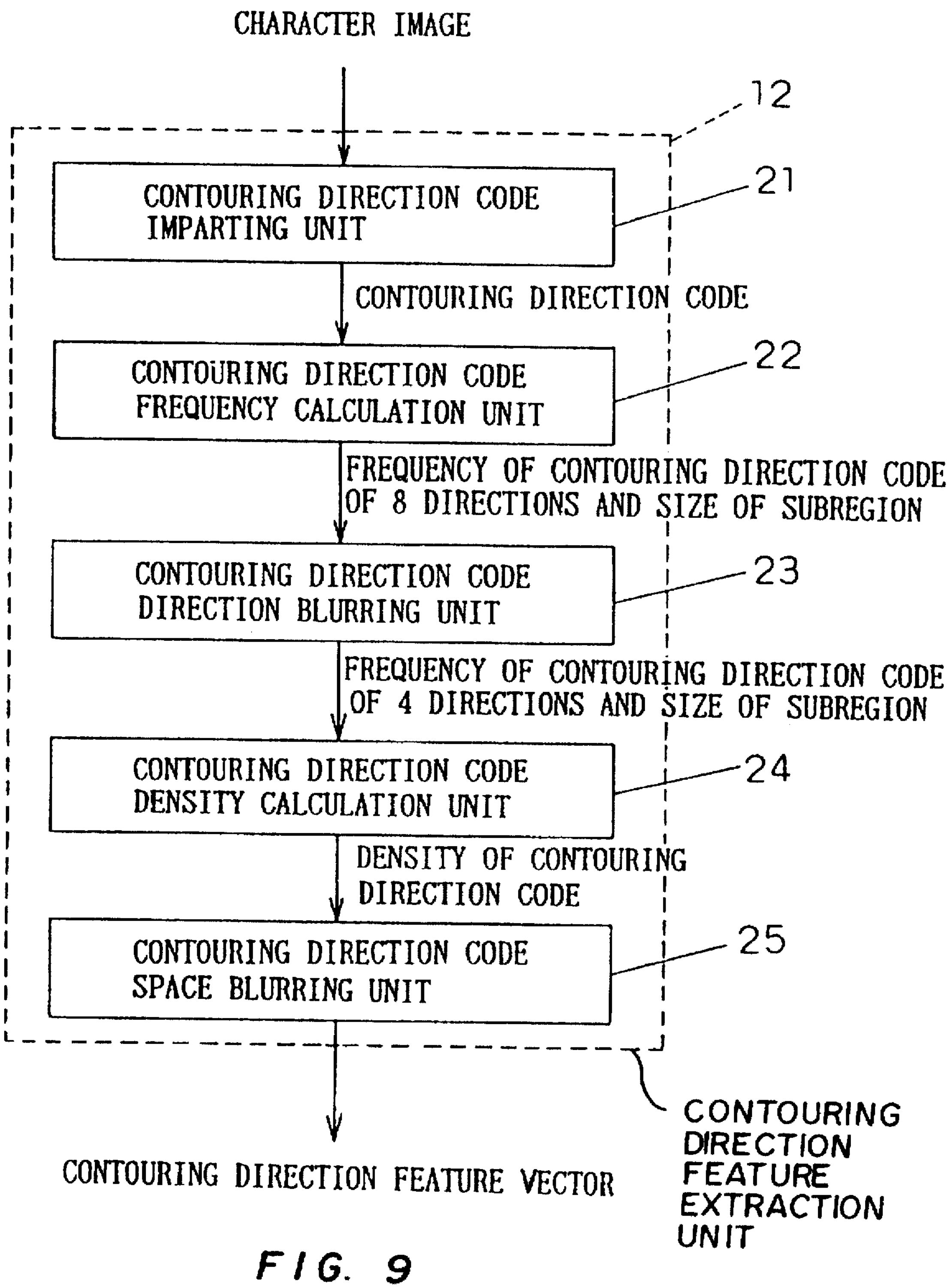
FIG. 9 is a block diagram of a contouring direction feature extraction unit of a second embodiment of the invention.

FIG. 9 is a block diagram of the contouring direction feature extraction unit 12 of a second embodiment of the invention. In FIG. 9, 21 designates a contouring direction code imparting unit which determines contouring direction codes for eight directions (respectively indicative of horizontal, vertical, upper right, and lower right directions, and four directions which equally divide two adjacent ones of the directions) of contour points of the character image of the recognition object separated by the character segmentation unit 11. The reference numeral 22 designates a contouring direction code frequency calculation unit which calculates the frequencies of the contouring directions obtained by the contouring direction code imparting unit 21, in each of subregions obtained by dividing the rectangle which is separated by the character segmentation unit 11, into M and N sections in horizontal and vertical directions (where M and N are arbitrary natural numbers). The reference numeral 23 designates a contouring direction code direction blurring unit which, for each of the subregions, conducts a weighted addition with an arbitrary weight coefficient on the frequency of contouring direction codes which are adjacent in direction to the respective contouring direction code with using the four directions of horizontal, vertical, upper right, and lower right directions as the center, thereby compressing the frequencies of the contouring direction codes of the eight directions into the frequencies of the contouring direction codes of the four directions. The reference numeral 24 designates a contouring direction code density calculation unit which calculates the density of the contouring direction codes of each of the subregions, by using the frequencies of the four direction codes obtained by the contouring direction code direction blurring unit 23, and the size of the respective subregion. The reference numeral 25 designates a contouring direction code space blurring unit which conducts a weighted addition with an arbitrary weight coefficient on each of the contouring direction codes of the subregions by adding the contouring direction code densities of neighbor subregions which are adjacent to the respective subregion with the subregion as the center and in a direction perpendicular to that of each of the contouring direction codes, thereby obtaining a contouring direction feature vector of (M×N×4) dimensions.

The operation of the thus configured character recognition apparatus of the second embodiment in the same case as the first embodiment or where the recognition object character is "大" will be described.

Figure 11:
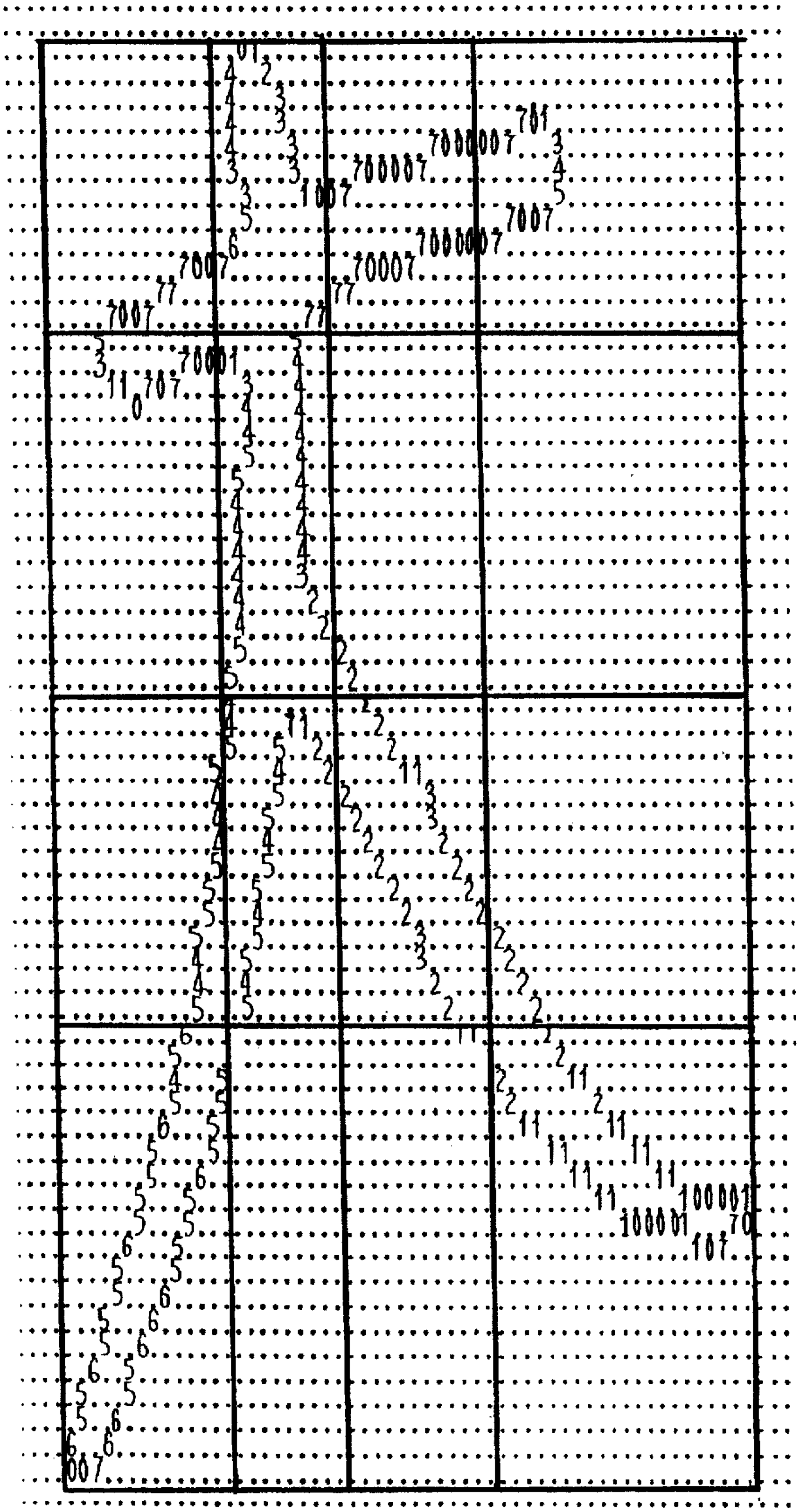
FIG. 11 is a diagram showing an example in which contour points of the recognition object character "大" are respectively provided with contouring direction codes in the second embodiment.

In the contouring direction feature extraction unit 12, in a similar manner as the first embodiment, the contouring direction code imparting unit 21 extracts contour points existing on a contour line of the character image separated by the character segmentation unit 11, and determines contouring direction codes of the extracted contour points. In this determination, the judgment on a contour point is conducted by using a mask of 3×3. More specifically, when at least one of pixel points which are adjacent to one black pixel point of the character area in the upper, lower, left, and right directions is a white pixel point, this black pixel point is judged to be a contour point. The contouring direction code of each contour point is determined by scanning the character image which has been subjected to the contour point extraction, by using a mask of 3×3 which is centered at the respective contour point, and checking whether the character image coincides with one of mask patterns such as shown in FIGS. 10(*a*)–10(*i*), thereby providing each contour points with a contouring direction code in which a contour line direction of the character is quantized in eight directions. When a mask of 3×3 centered at a certain contour point coincides with a mask pattern M1 shown in FIG. 10(*a*), for example, the contour point in attention is provided with a horizontal contouring direction code "0". Similarly, the contour point is provided with a vertical contouring direction code "4" when the mask coincides with a mask pattern M3, with a lower right contouring direction code "2" when the mask coincides with a mask pattern M2, and with a upper right contouring direction code "6" when the mask coincides with a mask pattern M4. In the same manner, the contour points are provided with contouring direction codes "1", "3", "5", or "7" by using mask patterns M5 to M12. FIG. 11 shows an example in which the contour points of the recognition object character "大" are provided with these contouring direction codes in the manner described above.

For each of 16 subregions obtained by dividing the character image into 4 sections (M=4) in a horizontal direction and 4 sections (N=4) in a vertical direction, as shown in FIG. 11, the contouring direction code frequency calculation unit 22 then counts the contouring direction codes of the contour points obtained by the contouring direction code imparting unit 21, and obtains the frequencies of the contouring direction codes of the eight kinds. FIGS. 12(*a*)–12(*h*) show the frequencies of the contouring direction codes of the subregions of the recognition object character "大" shown in FIG. 11, in the form of 4×4 matrices of contouring direction code frequency with respect to the eight directions of "0" to "7". In the same manner as the first embodiment, the character image was divided into the subregions by barycentric division.

For each of the subregions, the contouring direction code direction blurring unit 23 then conducts a weighted addition with a predetermined weight coefficient on the frequencies of contouring direction codes which are adjacent in direction to the respective contouring direction code with using "0" (horizontal), "4" (vertical), "6" (upper right), and "2" (lower right) directions as the center, thereby compressing the frequencies of the contouring direction codes of the eight directions into the frequencies of the contouring direction codes of the above-mentioned four directions of "0", "2", "4", and "6". Specifically, the frequencies of the contouring direction codes of the eight directions are compressed into those of the four directions by aggregating the frequencies by using a filter having weight coefficients shown in FIG.

13(*a*) with an even-numbered contouring direction code as the center. That is, when the frequencies of the contouring direction codes of the eight directions are indicated by $h_d$, the weight coefficients by $b_d$ (d indicates the direction of each contouring direction code and is 0 to 7), and the frequencies of the contouring direction codes compressed into the four directions by $H_k$ (k indicates the direction of each contouring direction code and is 0, 2, 4, or 6), $H_k$ is shown by Equation 2 below.

In Equation 2, when K=0, d is −1 (d=−1). In this case, Equation 2 is calculated with setting d to be 7 (d=7).

$$H_k = \Sigma\, b_d \cdot H_d \qquad \text{[Eq. 2]}$$

Where $0 \leqq d \leqq 7$, k=0, 2, 4, 6

$b_d$=1.0 when d=k, $b_d$=0.5 when d=k−1, k+1

FIGS. 14(*a*)–14(*d*) shows the frequencies of the contouring direction codes compressed into the four directions in the subregions of the recognition object character "大" shown in FIG. 11, in the form of matrices in the same manner as FIGS. 12(*a*)–12(*h*).

In the same manner as the first embodiment, for each of the subregions, the contouring direction code density calculation unit 24 then calculates the density of the contouring direction codes (hereinafter, referred to as "contouring direction code density") of each subregion by normalizing (dividing) the frequencies of the contouring direction codes obtained by the contouring direction code direction blurring unit 23, by the size of the respective subregion (e.g., the area, horizontal width, or vertical width of the subregion).

In the same manner as the first embodiment, the contouring direction code space blurring unit 25 then conducts a weighted addition on the contouring direction code density of each of the subregions by adding, with a predetermined weight coefficient, the contouring direction code densities of neighbor subregions which are adjacent to the respective subregion with the subregion as the center and in a direction perpendicular to that of each of the contouring direction codes, thereby spatially blurring the contouring direction code density. The specific operation of the unit is the same as that of the first embodiment, and therefore its description is omitted. A collection of the thus obtained contouring direction code density matrices constitutes a contouring direction feature vector which has 4(M)×4(N)×4, or 64 dimensions.

Results of the character recognition conducted in the character recognition apparatus having the contouring direction feature extraction unit 12 of the second embodiment will be described. Experiments were conducted in the same manner as the first embodiment.

Experimental results show that the embodiment attained a recognition rate of 93.5% which is higher than that of the first embodiment by 0.5%.

As described above, in the second embodiment, the contouring direction code direction blurring unit 23 is added to the configuration of the contouring direction feature extraction unit 12 of the first embodiment. In the same manner as the first embodiment, therefore, a positional deviation of a character line into a neighbor subregion can be absorbed by spatially blurring a character feature amount obtained as directional components of a character contour line in each local area. In the embodiment, furthermore, the contouring direction code direction blurring unit 23 conducts also the direction blurring process, and therefore also a slant variation of a character line in each local area can be absorbed. Consequently, a stable feature amount can always be obtained not only in the case of a positional variation of a character line but also in that of a slant variation, resulting in that the embodiment can attain a recognition performance which is higher in accuracy than that attained by the first embodiment.

Figure 15:
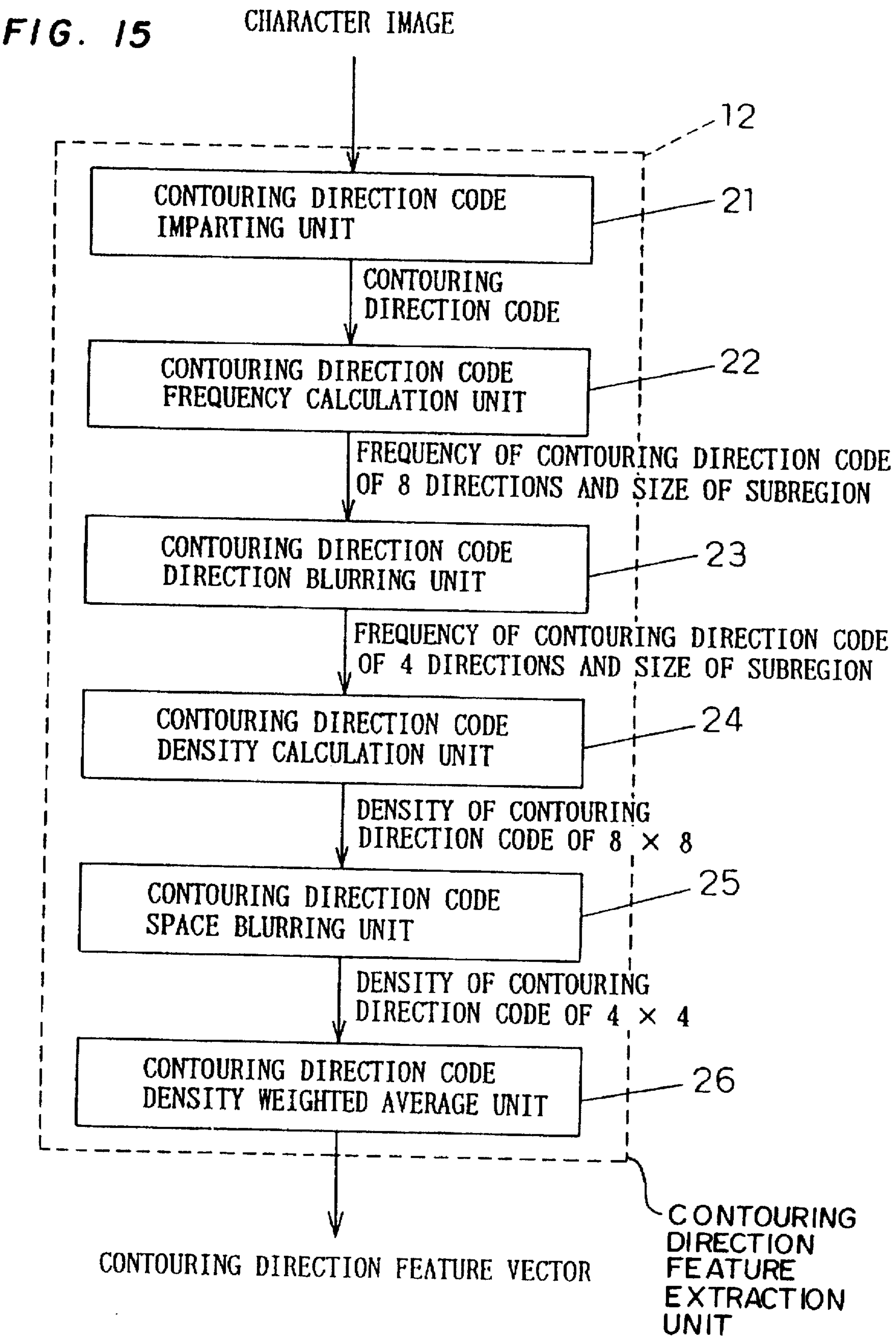
FIG. 15 is a block diagram showing a contouring direction feature extraction unit of a third embodiment of the invention.
Figure 16:
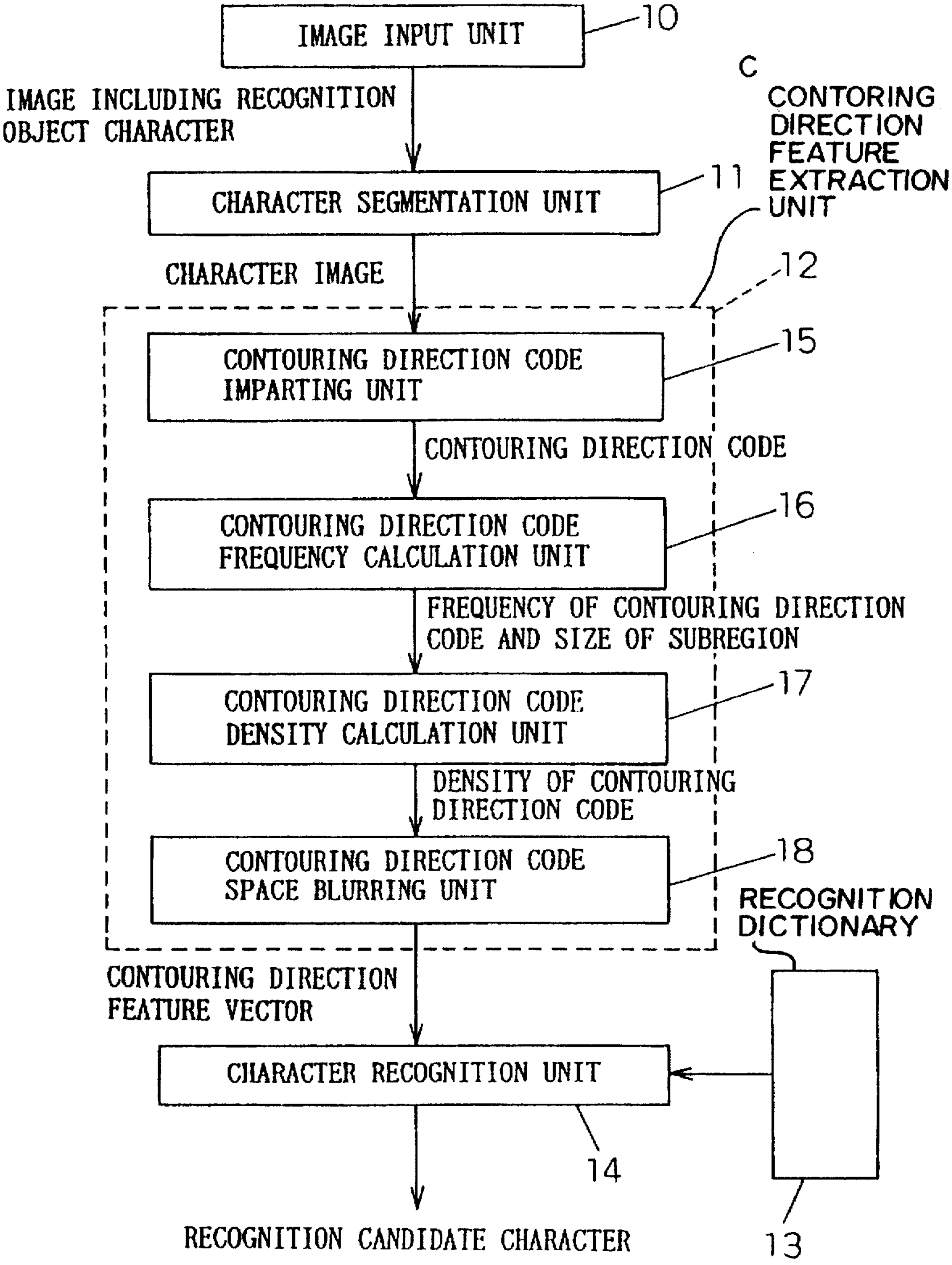
FIG. 16 is a block diagram showing a character recognition apparatus of the prior art.

FIG. 15 is a block diagram of the contouring direction feature extraction unit 12 of a third embodiment of the invention. In FIG. 15, portions indicated by 21 to 25 are the same as those used in the contouring direction feature extraction unit 12 of the second embodiment. The reference numeral 26 designates a contouring direction code density weighted average unit which, for each of the directions of the contouring direction codes, conducts a weighted average operation on the contouring direction code density of each subregion obtained by the contouring direction code space blurring unit 25 in neighbor subregions adjacent to the subregion, whereby an (M×N) number of contouring direction code densities are spatially compressed into a (P×Q) number of contouring direction code densities (M>P, and N>Q) to obtain a contouring direction feature vector.

The operation of the thus configured contouring direction feature extraction unit 12 will be described. In the embodiment, the contouring direction code density weighted average unit 26 is added to the configuration of the contouring direction feature extraction unit 12 of the second embodiment shown in FIG. 9, and the series of operations of the portions 21 to 25 starting from the input of a character image separated by the character segmentation unit 11 to the contouring direction code imparting unit 21, and ending at the obtainment of the contouring direction code densities for the subregions of the character image in the contouring direction code space blurring unit 25 are the same as those of the second embodiment. In the following, therefore, the description of these portions is omitted and the operation of the contouring direction code density weighted average unit 26 will be described. Unlike the second embodiment, the contouring direction code frequency calculation unit 22, the contouring direction code direction blurring unit 23, the contouring direction code density calculation unit 24, and the contouring direction code space blurring unit 25 obtain contouring direction code densities for 64 subregions while dividing the character image into 8 sections (M=8) in a horizontal direction and 8 sections (N=8) in a vertical direction in place of 4×4 division.

For each of the directions of the contouring direction codes, the contouring direction code density weighted average unit 26 conducts a weighted average operation on the contouring direction code density of each subregion obtained by the contouring direction code space blurring unit 25 in neighbor subregions of, for example, 2×2 adjacent to the subregion, whereby an (8×8) number of contouring direction code densities are spatially compressed into a (4×4) number of contouring direction code densities. Specifically, contouring direction code density matrices $G_k(i, j)$ (i and j indicate subregions, k indicates the direction of each contouring direction code, and, in the embodiment, $0 \leqq i$ and $j \leqq 7$, and $0 \leqq k \leqq 3$) obtained by the contouring direction code space blurring unit 25 are converted into spatially compressed contouring direction code density matrices $A_k(i, j)$ ($0 \leqq i$, j, and $k \leqq 3$), by using an average filter of 2×2. When using a mathematical expression, this can be indicated by Equation 3 as follows:

[Eq. 3]

$$A_k(i,j)=G_k(2i,2j)+G_k(2i+1,j)+G_k(2i,2j+1)+G_k(2i+1,2j+1)$$

A collection of the thus obtained contouring direction code density matrices $A_k(i, j)$ constitutes a contouring direction feature vector which has 4×4×4, or 64 dimensions.

Generally, a kanji has a complex shape and there are many characters similar to the kanji. In order to discriminate these kanjis from each other, therefore, a character image must be divided into subregions in a certain fine degree. As the number of subregions is larger, a feature vector has a larger number of dimensions. When the dimension number of a feature vector is increased, therefore, a recognition rate of kanjis or the like can be improved, but the period required for checking an input character with the recognition dictionary 13 is usually prolonged and also the capacity of the recognition dictionary 13 is increased. Consequently, a character recognition apparatus requires a character feature amount in which a feature vector has a small number of dimensions and which has an excellent recognition performance.

In view of the above consideration, according to the embodiment, the contouring direction code density weighted average unit 26 is added to the configuration of the contouring direction feature extraction unit 12 of the second embodiment. A 64-dimensional feature vector obtained by the embodiment has a lower recognition performance than that of a 256-dimensional feature vector which is obtained by the contouring direction feature extraction unit 12 described in conjunction with the first and second embodiments, with setting the region division number to be 8×8. Among feature vectors of the same dimension number or of 64 dimensions obtained with setting the region division number to be 4×4 and including those obtained in the prior art example, however, a 64-dimensional feature vector obtained by the embodiment has the highest recognition performance because a contouring direction feature vector which is obtained by the second embodiment and in which a local positional variation and a slant variation of a character line are absorbed is further spatially compressed in an efficient manner by spatially and directionally blurring directional components of a character contour line in each local area.

Finally results of the character recognition which were experimentally obtained in the character recognition apparatus using the contouring direction feature extraction unit 12 of the third embodiment will be described. The experiment was conducted in the same manner as that of the first embodiment. For comparison, with setting the parameters M and N of the region division number for a character image to be 4 (M=4, and N=4), recognition experiments were conducted on the character recognition apparatuses of the prior art example, and the first and second embodiments (i.e., character recognition apparatuses using a 64-dimensional feature vector).

As a result of the experiment, the embodiment attained a recognition rate of 87.2%. The comparison experiments on the character recognition apparatuses of the prior art example, and the first and second embodiments show results of 85.1%, 80.5%, and 81.1%, respectively.

As seen from the above, although the embodiment is inferior in recognition performance than the character recognition apparatuses which use the contouring direction feature extraction unit 12 of the first and second embodiments and a feature vector of 256 dimensions (M=8, and N=8), the embodiment attained the highest recognition rate as compared with the comparison experiments on the prior art example, and the first and second embodiments in which a feature vector of the same dimension number (64 dimensions) is used.

As described above, in the character recognition apparatus of the invention, for each direction of each direction code, the contouring direction code space blurring unit conducts a blurring process in a direction perpendicular to the direction of the direction code, on the character feature amount obtained as the density of directional components of a contour line of a character of each local region. As compared with a feature amount which is used in the prior art example and has not been subjected to the blurring process, therefore, the feature amount has a very small variation amount or is stable even when a character line is positionally deviated into a neighbor subregion by a local variation in position or thickness of the character line. Even when the recognition object is a character such as a hand-written kanji which has a complex structure and in which positions of character lines locally vary in a very large degree, therefore, the apparatus of the invention can attain a highly accurate and stable recognition performance.

In the first to third embodiments described above, the region division number of a character image, the direction blurring process masks, and the weight coefficient of the filter for direction blurring are not restricted to those used in the embodiments, and may be set to be various values.

In the embodiments described above, the density of frequency is used as information relating to the frequency. The invention is not restricted to this, and other kinds of information relating to the frequency may be used. Alternatively, the frequency may be used as it is.

In the embodiments described above, the contour lines of four or eight directions are used. The invention is not restricted to this.

In the embodiments described above, in order to obtain the direction of contour lines, 8 pixels adjacent to a contour point are used. It is a matter of course that the invention is not restricted to this and the range for obtaining the directions may be widened by, for example, adding adjacent pixels to the 8 pixels.

In the embodiments described above, the processing units are configured by dedicated hardware. In place of the hardware, the same functions may be realized in a software manner by using a computer.

As apparent from the above description, the apparatus of the invention comprises the contouring direction code space blurring means for, on the basis of a frequency of contouring direction codes for each subregion or information relating to the frequency, such as a density in the subregion, conducting, for each of the contouring direction codes, a weighted addition on a frequency or information relating to the frequency of each subregion (A) by adding, with a predetermined weight coefficient, a frequency or information relating to the frequency of a subregion in the vicinity of the subregion (A). Therefore, the invention has an advantage that a character can stably be recognized with high accuracy.

What is claimed is:

1. A character recognition apparatus comprising:

contouring direction feature extracting means for extracting a contouring direction feature vector which is used for recognizing a character from an inputted character image, and character recognition means for extracting recognition candidate characters based on the contouring direction feature vector extracted by said contouring direction feature extracting means, wherein said contouring direction feature extracting means has contouring direction code imparting means for obtaining, for each contour point of an inputted character image, contouring direction codes in which a direction of a contour line of a character is quantized in at least four directions, from at least a pattern of pixels adjacent to the contour point;

contouring direction code frequency calculation means for obtaining a frequency of each of the obtained contouring direction codes, for each subregion obtained by dividing the character image into M sections in a horizontal direction and N sections in a vertical direction; and contouring direction code space blurring means for obtaining the contour direction feature vector, on the basis of the obtained frequency, by conducting, for each contouring direction code, a weighted addition on the frequency of each subregion (A) by adding, with a predetermined weight coefficient, the frequency of a subregion in the vicinity of the subregion (A).

2. A character recognition apparatus according to claim 1, wherein said subregion in the vicinity is a subregion which, for each of the contouring direction codes, is adjacent to the subregion (A) in a direction perpendicular to the direction.

3. A character recognition apparatus according to claim 1, wherein said contouring direction code imparting means obtains contouring direction codes which are quantized in K directions, K being a predetermined number, and said contouring direction feature extracting means includes a contouring direction code direction blurring unit which conducts, for each of the subregions, a weighted addition, with a predetermined weight coefficient, by adding the contouring direction code frequencies of L directions among K directions, L being a predetermined number less than K (L<K), and the frequencies of the contouring direction codes which are adjacent in direction to the respective contouring direction code with the respective direction as a center direction, thereby compressing the frequencies of the contouring direction codes of K directions into the frequencies of the contouring direction codes of L directions.

4. A character recognition apparatus according to claim 1, wherein said contouring direction feature extracting means includes contouring direction code density weighted average means for performing weighted mean calculation on adjacent subregions for the density of the contouring direction codes of each subregion which are obtained by said contouring direction code space blurring means, thereby spatially compressing the densities of an (M×N) number of contouring direction codes into densities of a (P×Q) smaller number of contouring direction codes (M>P and N>Q).

5. A character recognition apparatus according to claim 2, wherein said contouring direction code imparting means obtains contouring direction codes which are quantized in K directions, K being a predetermined number, and said contouring direction feature extracting means includes a contouring direction code direction blurring unit which conducts, for each of the subregions, a weighted addition, with a predetermined weight coefficient, by adding the contouring direction code frequencies of L directions among K directions, L being a predetermined number less than K (L<K), and the frequencies of the contouring direction codes which are adjacent in direction to the respective contouring direction code with the respective direction as a center direction, thereby compressing the frequencies of the contouring direction codes of K directions into the frequencies of the contouring direction codes of L directions.

6. A character recognition apparatus according to claim 2, wherein said contouring direction feature extracting means includes contouring direction code density weighted average means for performing weighted mean calculation on adjacent subregions for density of the contouring direction codes of each subregion which are obtained by said contouring direction code space blurring means, thereby spatially compressing the densities of an (M×N) number of contouring direction codes into densities of a (P×Q) smaller number of contouring direction codes (M>P and N>Q).

7. A character recognition apparatus according to claim 3, wherein said contouring direction feature extracting means includes contouring direction code density weighted average means for performing weighted mean calculation on adjacent subregions for the density of the contouring direction codes of each subregion which are obtained by said contouring direction code space blurring means, thereby spatially compressing the densities of an (M×N) number of contouring direction codes into densities of a (P×Q) smaller number of contouring direction codes (M>P and N>Q).

8. A character recognition apparatus according to claim 1, wherein said contouring direction feature extracting means includes a contouring direction code density calculation means which obtains a density of each of the contouring direction codes for each of said divided subregions of said contouring direction code frequency calculation means by utilizing the contouring direction code frequency and a size of each said subregion.

9. A character recognition apparatus according to claim 8, wherein said contouring direction feature extracting means includes contouring direction code density weighted average means for performing weighted mean calculation on adjacent subregions for density of the contouring direction codes of each subregion which are obtained by said contouring direction code space blurring means, thereby spatially compressing the densities of an (M×N) number of contouring direction codes into densities of a (P×Q) smaller number of contouring direction codes (M>P and N>Q).

* * * * *